United States Patent
Thomas

(10) Patent No.: US 9,910,773 B2
(45) Date of Patent: Mar. 6, 2018

(54) METHOD AND SYSTEM FOR COMPACTING DATA IN NON-VOLATILE MEMORY

(71) Applicant: SanDisk Technologies Inc., Plano, TX (US)

(72) Inventor: Nicholas James Thomas, Dundee (GB)

(73) Assignee: SanDisk Technologies LLC, Plano, TX (US)

( * ) Notice: Subject to any disclaimer, the term of this patent is extended or adjusted under 35 U.S.C. 154(b) by 93 days.

(21) Appl. No.: 15/083,723

(22) Filed: Mar. 29, 2016

(65) Prior Publication Data

US 2017/0286291 A1 Oct. 5, 2017

(51) Int. Cl.
  *G06F 12/02* (2006.01)

(52) U.S. Cl.
  CPC .. *G06F 12/0253* (2013.01); *G06F 2212/1044* (2013.01); *G06F 2212/2022* (2013.01); *G06F 2212/7205* (2013.01)

(58) Field of Classification Search
  None
  See application file for complete search history.

(56) References Cited

U.S. PATENT DOCUMENTS

| | | | |
|---|---|---|---|
| 6,397,379 B1 | 5/2002 | Yates, Jr. et al. | |
| 8,954,656 B2 | 2/2015 | Thomas | |
| 2002/0152335 A1 | 10/2002 | Holm et al. | |
| 2006/0129743 A1 | 6/2006 | Herrell et al. | |
| 2008/0180450 A1 | 7/2008 | Dowling | |
| 2009/0210614 A1* | 8/2009 | Gorobets | G06F 12/0292 711/103 |
| 2012/0011340 A1 | 1/2012 | Flynn et al. | |
| 2013/0021846 A1 | 1/2013 | Rao | |
| 2013/0275649 A1 | 10/2013 | Zhang et al. | |
| 2014/0379959 A1* | 12/2014 | Canepa | G06F 12/0246 711/103 |
| 2015/0186259 A1 | 7/2015 | Thomas et al. | |
| 2015/0347026 A1 | 12/2015 | Thomas | |
| 2017/0199824 A1* | 7/2017 | Bennatan | G06F 12/1009 |

* cited by examiner

*Primary Examiner* — Kevin Verbrugge
(74) *Attorney, Agent, or Firm* — Brinks Gilson & Lione

(57) ABSTRACT

A system and method for compacting data in a non-volatile memory system that may reduce the need for control data updates is described. The method may include copying valid data from a source block to a destination block, and also writing new host data to the destination block, such that the offset position in the destination block of the copied data is the same as in the source block and fewer mapping table updates are needed for the copied data. The system may include a non-volatile memory system with a coarse granularity mapping table and a fine granularity mapping table where a controller in the non-volatile memory system is configured to only update the coarse granularity mapping table for compacted data written to a new block, but is configured to update both the fine and coarse granularity mapping tables for new host data written to the new block.

18 Claims, 10 Drawing Sheets

METHOD AND SYSTEM FOR COMPACTING DATA IN NON-VOLATILE MEMORY

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. Flash memory is often made up of groups of memory cells referred to as pages, and multiple pages are often then organized in groups known as blocks. Flash memory cells may be physically configured to store data in different bit per cell densities.

Modern SSDs or similar memory systems utilizing NAND flash (or a similar physical storage media) share a common challenge to continually create space in which to write to the device. Creation of this space is generally accomplished through a maintenance operation commonly termed garbage collection or compaction. This type of maintenance operation is inherent in NAND flash due to the inability to write in place to flash memory, and due the mismatch between the smaller write granularity and larger erase granularity typical of flash memory. Garbage collection usually includes the copying of valid data from a source block to a new block and the subsequent erasure of the source block for reuse. The garbage collection process can introduce a significant processing burden which may reduce SSD performance and endurance, not only because it introduces extra writing of the data being moved, but also because it introduces extra address update data (control data) writing necessary to keep track of the data being moved.

DETAILED DESCRIPTION

Figure 1A:
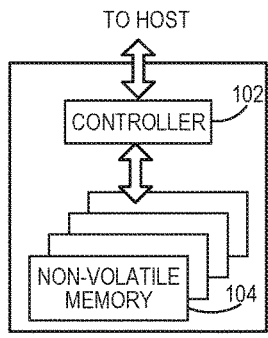
FIG. 1A is a block diagram of an example non-volatile memory system.

In order to reduce the burden of garbage collection processing, a method and system for managing compaction of data through garbage collection is disclosed that may reduce the amount of control data writing, where control data may also be referred to as mapping data, is usually necessary in garbage collection.

According to a first aspect, a method and system is described for compacting data in a non-volatile memory that mixes both valid data copied from a previously programmed block, and new data generated or received by the memory system, in a destination block. The valid data may be copied from an original offset position in the source block to a same offset position in the destination block, while the new data is written to remaining offset positions in the destination block corresponding to offset locations associated with obsolete data in the source block.

In another aspect, a non-volatile memory system is disclosed. The system may include a non-volatile memory having a plurality of memory blocks, a fine granularity mapping table containing mapping entries of logical addresses to virtual addresses and a coarse granularity mapping table containing mapping entries of the virtual addresses to physical addresses associated with the plurality of memory blocks. The system may further include a controller in communication with the non-volatile memory, where the controller is configured to relocate valid data from a source block selected from the plurality of memory blocks to a relocation block in the plurality of memory blocks and write new data to the relocation block. The controller is configured to update both the fine granularity mapping table and the coarse granularity mapping table to map the new data written to the relocation block, but only update the coarse granularity mapping table, without updating any fine granularity mapping table mapping entries, in response to relocating valid data from the source block to the relocation block. In order to relocate the valid data and write the new data to the relocation block, the controller may be configured to sequentially review data at each data offset in the source block and, at each particular data offset. When data at the particular data offset is valid data, the controller is configured to copy the valid data from the particular data offset to an identical data offset in the relocation block, and when data at the particular data offset is obsolete data, the controller is configured to write new data to the identical data offset in the relocation block.

In another aspect, a non-volatile memory system includes a non-volatile memory having a plurality of memory blocks and a controller in communication with the non-volatile memory. The controller is configured to select a fully programmed block from the plurality of memory blocks as a source block and copy valid data from a particular offset location in the source block to a same particular offset location in a destination block in the plurality of blocks. The controller is further configured to write new data to the destination block only at offset locations corresponding to offset locations of obsolete data in the source block, where the destination block contains all valid data from the source block in offset locations identical to original offset locations of the valid data in the source block upon completion of copying all valid data from the source block.

In different embodiments, the controller is configured to select a least recently used block in the non-volatile memory as the source block or to select a block in the non-volatile memory having a least amount of valid data as the source block. Also, the source block may only comprise mapping data for the non-volatile memory and the new data may comprise only updated mapping data in different implementations FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8or more NAND channels may exist between the controller and the NAND memory device, depending on controller capabilities. In any of the embodiments described herein, more than a single channel may exist between the controller and the memory die, even if a single channel is shown in the drawings.

Figure 1B:
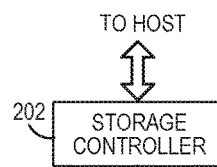
FIG. 1B is a block diagram illustrating an exemplary storage module.
Figure 1B:
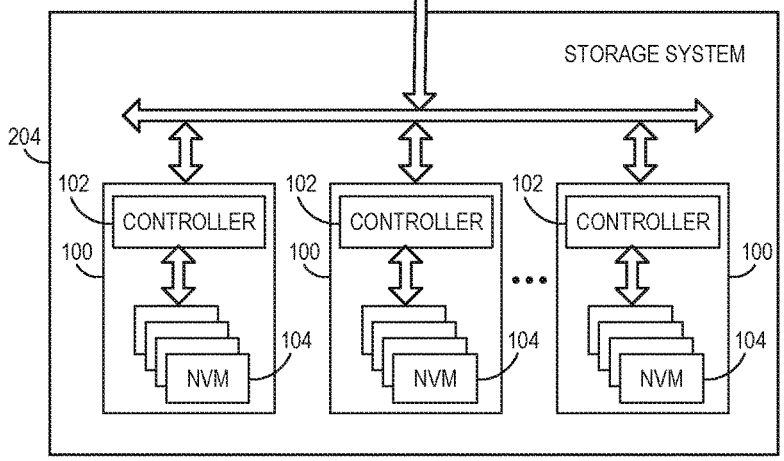

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
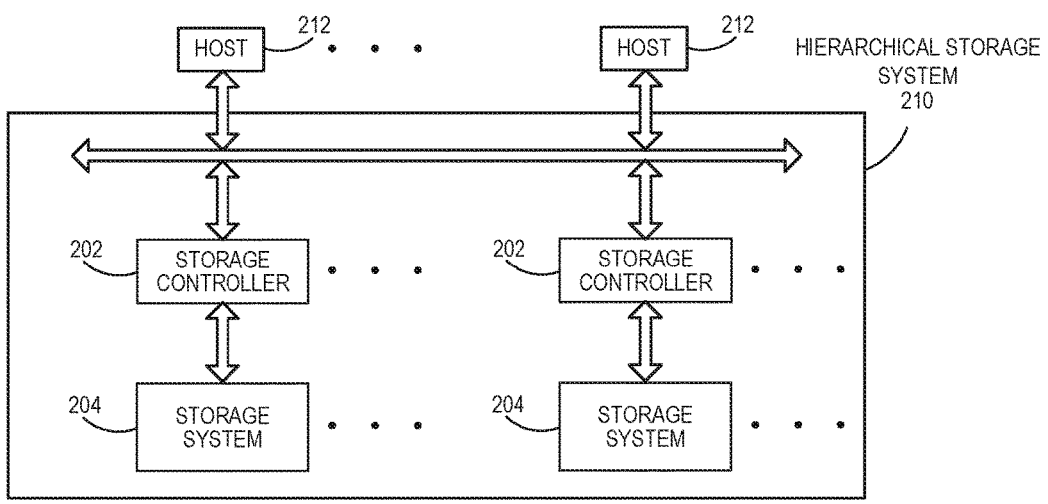
FIG. 1C is a block diagram illustrating a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
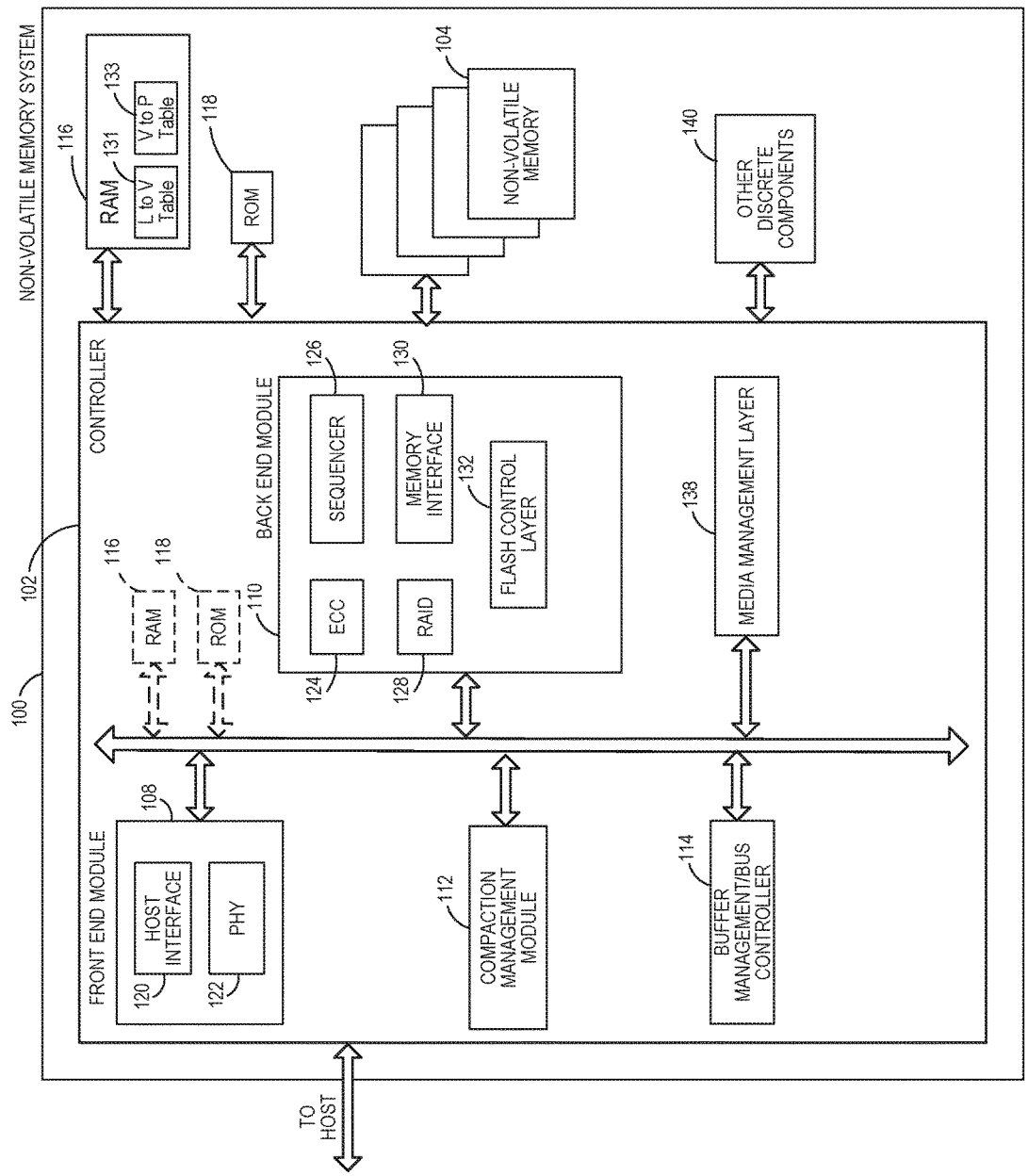
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a compaction management module 112 present on the die of the controller 102. As explained in more detail below in conjunction with reference to FIGS. 5-10, the compaction management module 112 may control both the copying of valid data from a previously programmed block and the writing of new data into the same open block. The compaction module may implement the copying of the valid data by copying the data to a same offset position in the open block as the offset position the data previously resided in the previously programmed source block. The compaction management module 112 may direct the controller 102 to only write new data to offset positions that were occupied by obsolete data in the previously programmed source block so that at least some of the mapping information for the copied valid data need not be updated. In one implementation, the data structures mapping logical addresses received from a host and physical addresses of blocks in non-volatile memory 104 may be broken up into separate tables such as a high granularity table, also referred to herein as a logical-to-virtual mapping table 131, and a low granularity table, also referred to herein as a virtual-to-physical mapping table 133 that may be stored in non-volatile memory 104 and/or RAM 116.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102.

In alternative embodiments, one or more of the physical layer interface 122, RAID module 128, media management layer 138 and buffer management/bus controller 114 are optional components that are not necessary in the controller 102.

Figure 2B:
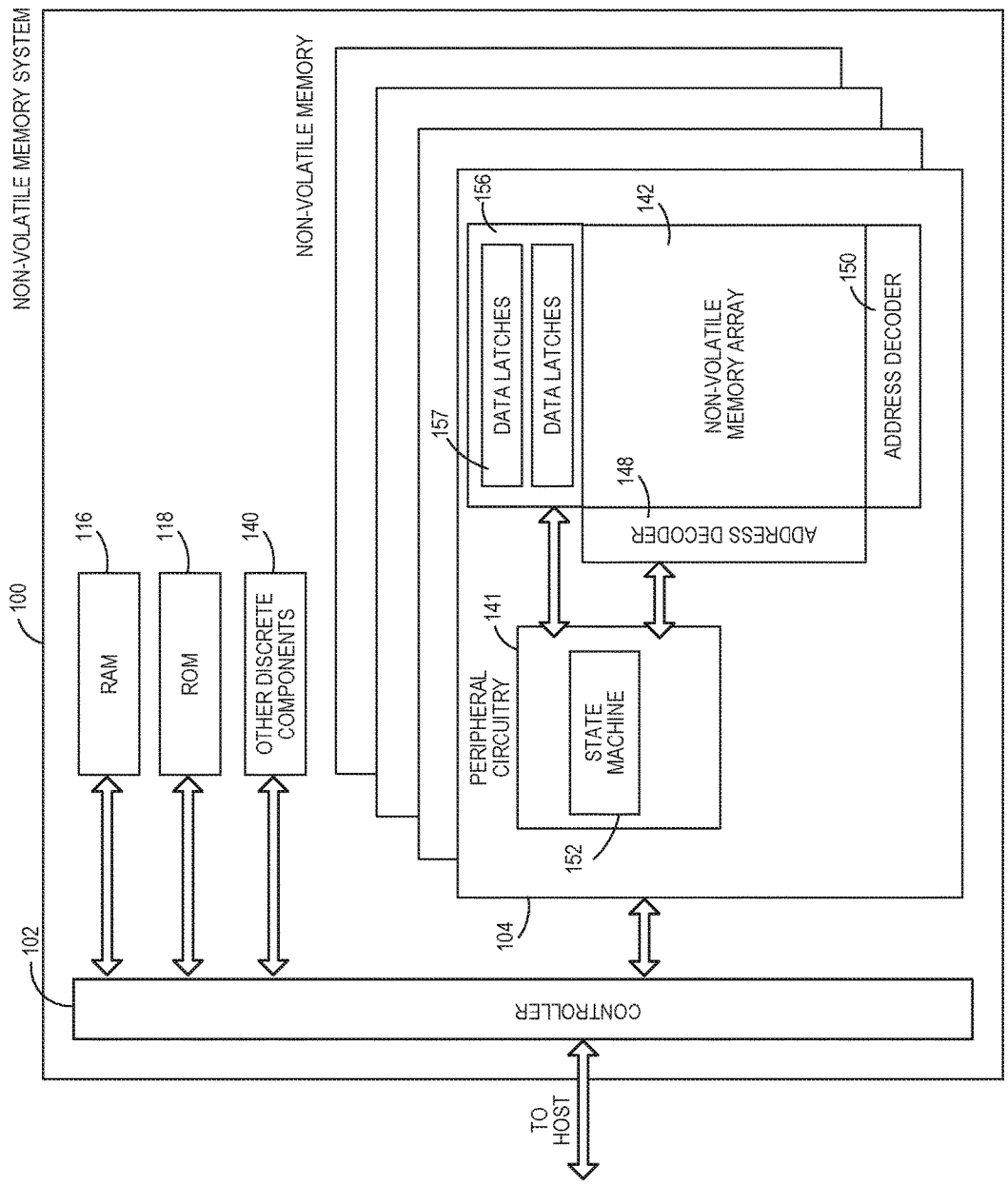
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

Figure 3:
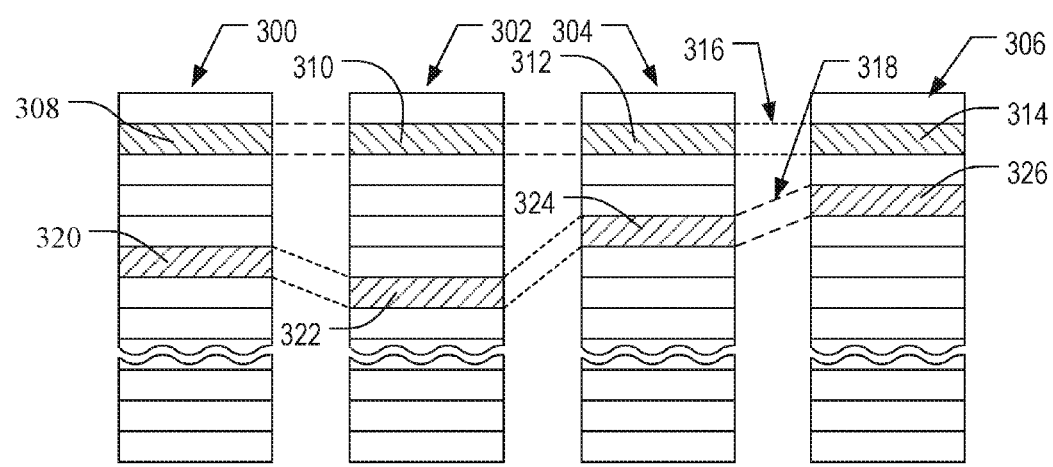
FIG. 3 illustrates an example physical memory organization of the non-volatile memory system of FIG. 1A.

The non-volatile flash memory array 142 in the non-volatile memory 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
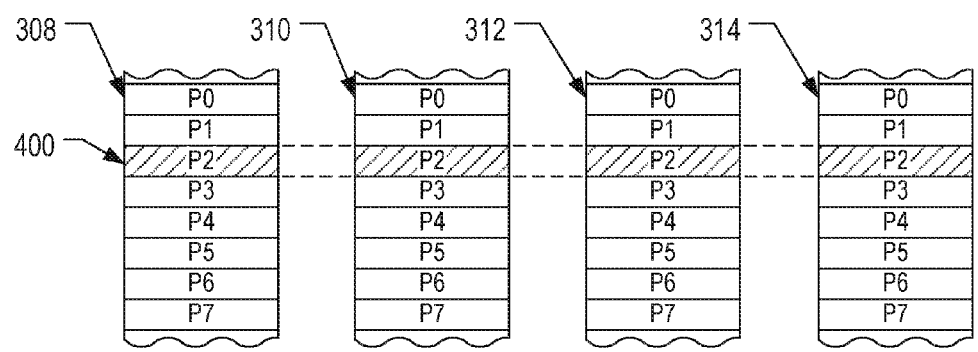
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312 and 314, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 400 is illustrated in FIG. 4 as formed of one physical page for each of the four blocks 308, 310, 312 and 314. The metapage 400 includes the page P2 in each of the four blocks but the pages of a metapage need not necessarily have the same relative position within each of the blocks. A metapage is typically the maximum unit of programming, although larger groupings may be programmed. The blocks disclosed in FIGS. 3-4 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the non-volatile memory system 100 where the data is physically stored.

In an exemplary embodiment discussed herein, an LBA may be mapped to an intermediary virtual block address and the virtual block address in turn may be mapped to a physical block. Data stored in one physical block may be copied to different physical block. After copying the data, virtual block address may be remapped to point to the new physical block. One advantage of performing the remapping using the intermediate virtual block address is that the logical block address associated with the data is not changed. Because the logical block address associated with the data is not changed, the host system may be agnostic to the remapping of the logical block address and the copying of the data from one physical block to a second physical block.

In addition to the user data and host-generated file system tables that may be stored in flash memory on the storage device, the storage device itself stores and maintains a mapping table or other data structure that tracks the logical addresses supplied by the host file system and the physical addresses where the storage device is keeping the data. One way to maintain a primary mapping table of all logical to physical address relationships (a logical to physical mapping table) in the storage device is to maintain the entire table in flash memory (such as NAND flash) and to then copy the entire table into mapping table in RAM 116 in the NVM system 102.

As noted above, in one implementation the mapping table may be a pair of mapping tables, with a logical to virtual mapping table and a virtual to physical mapping table, rather than a single logical-to-physical mapping. In this implementation, one or more entries in the logical-to-virtual mapping table may include a reference to an entry in the virtual-to-physical to mapping table. An entry in the virtual-to-physical mapping table may include a reference to a physical block where the memory controller may store data received from the host system 100.

Figure 5:
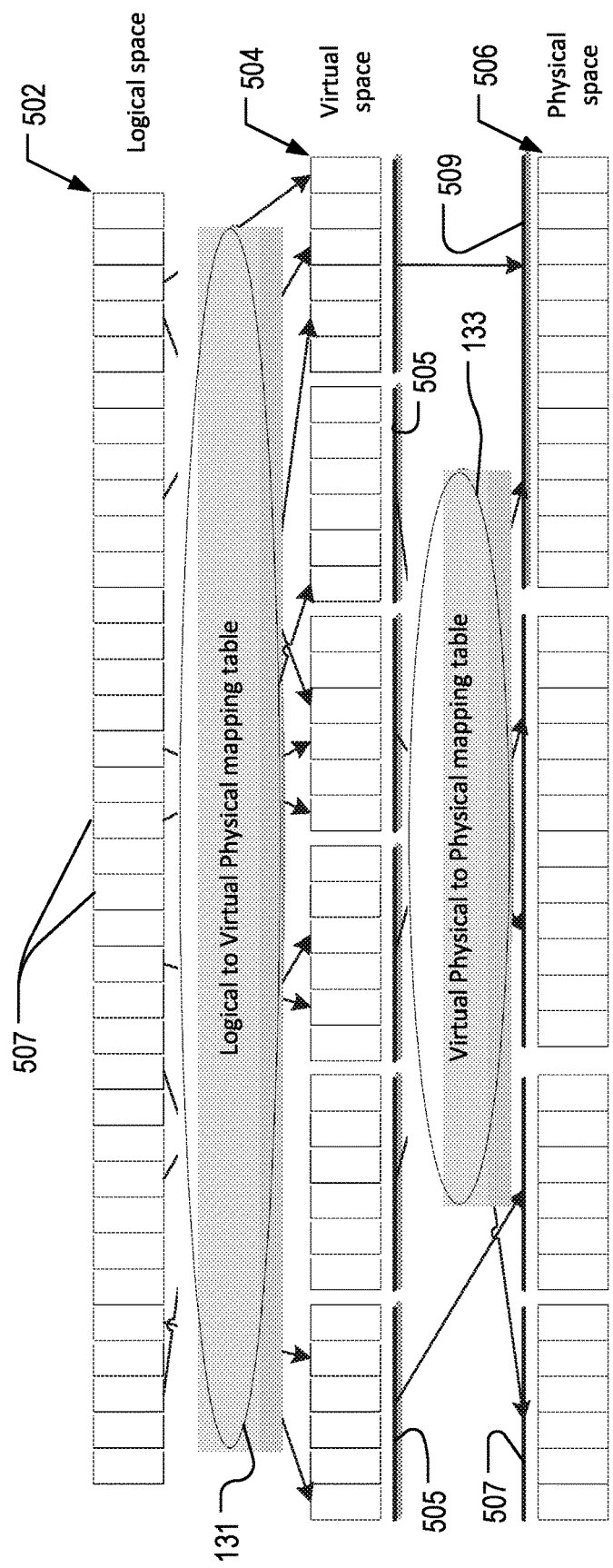
FIG. 5 is a conceptual view of the logical address space, virtual address space and physical address space, and associated mapping table structure, according to an embodiment of the system of FIGS. 2A-2B.

FIG. 5 is a block diagram of one embodiment of the mapping tables 131, 133 and memory 104 of FIG. 2A. The logical address space 502 consists of multiple LBAs 503 assigned by the host that are mapped to a virtual space 504, where the virtual space is divided in to virtual blocks 505, via the logical-to-virtual mapping table 131. The virtual blocks 505 in the virtual space 504 are then mapped to the large physical blocks 509 or small physical blocks 507 in the physical address space 506 of the non-volatile memory 104 via the virtual-to-physical mapping table 133. The logical-to-virtual mapping table 131 includes mapping entries for each LBA, while the virtual-to physical mapping table 133 maps one or more virtual blocks to a physical block, in one implementation. In this embodiment, an entry in the logical to virtual mapping table 131 corresponds to a logical block address, where each entry includes both a virtual block identifier and the offset position in that virtual block of where the data is positioned. In the example of FIG. 5, the virtual block 505 is the same size as a small physical block 507 and a whole number multiple of the virtual block size equals the size of a large physical block 509. Thus, the offset position of the data in the virtual block 505 is equal to (for the small physical blocks 507), or correlated to (for the physical blocks 509), the offset position of the data in the physical block associated with the virtual block (or virtual blocks for the larger physical blocks).

Multiple entries in the logical-to-virtual mapping table 131 may include a reference to a single entry in the virtual-to-physical mapping table 133. The virtual-to-physical mapping table 133 includes block level mapping, where each virtual block 505 is an aggregation of multiple logical block addresses. Accordingly, the virtual-to-physical mapping table 133 is a much lower or coarser granularity table than the logical-to-virtual mapping table 131. In one implementation, the finer granularity logical-to-virtual table 131 may map a logical block address for each 4 kilobytes of data and is typically no smaller than that 4 kilobyte increment. Other granularities that are less than the block size could be used for the coarser granularity virtual-to-physical mapping table 133. An entry in the virtual-to-physical mapping table 133 may include a reference to a single physical block or a reference to the start of a group of contiguous physical blocks.

In the example of FIG. 5, there is a 1 to 1 mapping of virtual to physical blocks for the small physical blocks 507. Where the physical space 506 includes large physical blocks 509 that are larger than the virtual blocks 505, the entries of the virtual-to-physical mapping table 133 may be a 2 to 1 mapping that also includes a virtual block offset to account for the fact that more than one virtual block is included and allow accurate translation of the offset position of data in the virtual blocks to the final offset position of that data in the physical block. Although two different physical block sizes are illustrated in FIG. 5, in other embodiments a single physical block size or more than two different physical block sizes are contemplated and may be mapped using the same principles outlined herein. If there is a mismatch in size between the virtual blocks 505 and the physical blocks (or groups of physical blocks) then the mismatch should be such that one is an integer multiple in size of the other. If the virtual block is smaller than the physical block then offset information is needed in the virtual-to-physical mapping table 133. If the mismatch in size is the other way around, the virtual-to-physical mapping table needs to contain multiple physical blocks per entry.

Figure 6:
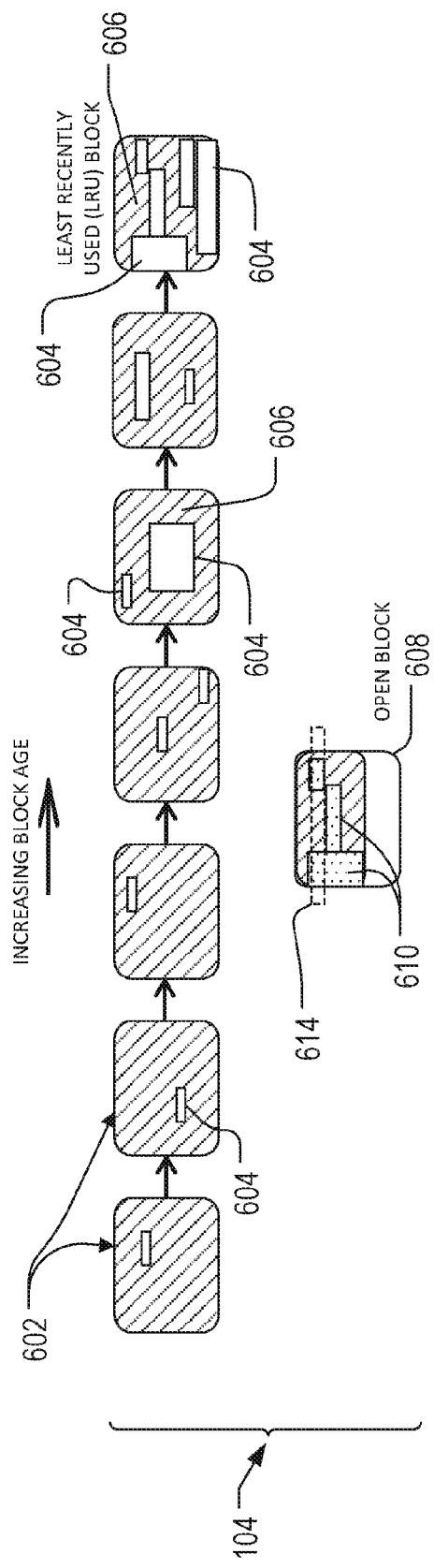
FIG. 6 illustrates a set of memory blocks and associated valid and obsolete data locations usable in the system of FIGS. 2A-2B.

Referring to FIG. 6, a simplified diagram is shown of the non-volatile memory 104 with a limited pool of 8 blocks 602, 7 fully programmed and 1 open for programming, that are used to contain data. Control data for mapping this data may be contained in a separate pool of blocks not shown in the diagram. As new data is written into the non-volatile memory 104, the previous version of the data that is no longer required becomes obsolete data, and that obsolete data tends to build up slowly in all blocks 602. The granularity of data addressing is typically much smaller than the size of the physical block. In many cases, the oldest blocks will tend to have the most obsolete space, but this is not always the case. The least recently used block, which is the block 602 at the far right of FIG. 6, has the greatest amount of obsolete data 604, and thus the least amount of valid data 606

As there is a limited pool of blocks 602 in the system of FIG. 6 in which to hold the data, eventually a garbage collection process must be initiated which moves valid data 606 from previously programmed blocks with little valid data 606 to a new block in order to free the obsolete space in the old blocks. The data copied from the previously fully programmed block data is referred to as relocation data, and the previously fully programmed block selected to have its valid data copied in a garbage collection operation is referred to as the source block.

When a garbage collection operation is triggered, for example when a number of free blocks (blocks available for writing new data that contain only obsolete data) falls below a predetermined threshold for the system, a source block is selected by the controller 102 for the garbage collection operation. Many algorithms for selecting the best source block for such garbage collection have been proposed, including greedy (selection of the block with the most obsolete space), LRU (selection of the least recently written block), or combinations/variations on these themes. Although the example of FIG. 6 shows LRU-based selection of relocation source block, other source block selection techniques are contemplated.

In the example non-volatile memory 104 of FIG. 6, a single open block 608 is available and is used as the destination both for the relocated valid data from the LRU block and for the new data arriving into the system or a separate relocation block. In one implementation, the new data from the host and the relocated data from the source block is sent to the same open block. As discussed in greater detail herein, the relocation of valid data from the source block to a same physical offset in the destination block as it had in the source block, coupled with writing new data into the destination block at the remaining offset locations that correspond to where obsolete data was located in the source block, permits efficiencies in the mapping of the data.

Referring again to FIG. 6, the open block 608 is shown to be receiving the valid data 606 from the source block (LRU block in this example) and that valid data is being written to the same offset locations in the open block as in the source block. The offset locations that formerly contained obsolete data 604 from the source block are written to with new host data 610 in the open block by the controller 102 of the NVM system 100. In the example of FIG. 6, the process of writing to the open block is shown only partly completed. When completed, relocated valid data from the garbage collection will occupy the same offset positions as the valid data from the source block and new data will occupy the offset positions corresponding to the obsolete data regions of the source block.

Figure 7:
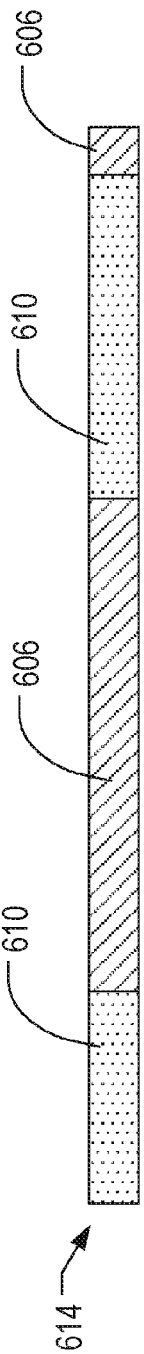
FIG. 7 is an expanded view of a page from one of the memory blocks of FIG. 6.

The data portion 614 identified with dashed lines in FIG. 6 is shown enlarged in FIG. 7 for ease of reference, As shown in FIG. 7, the new host data 610 alternates with the relocated valid data 606. In one implementation, the data portion 614 may be a page of the open write block 608, where the block 608 is written to in sequential page order from top to bottom, in the conceptual example of FIG. 6, and where each page is written in sequential order from left to right. Thus, the controller 102 of the NVM system 100 will cause the write operation to retrieve and write the valid data being relocated from the source block, or the new data being received from the host, in the offset order that corresponds to the offset position in the selected source block.

Figure 8:
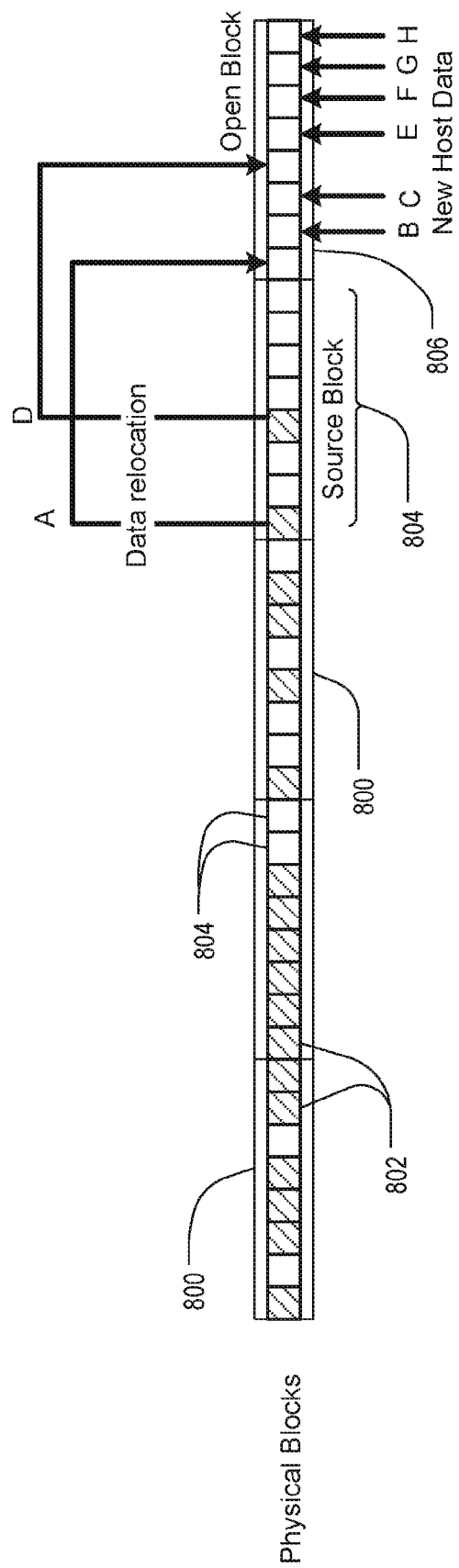
FIG. 8 illustrates the sequential writing of both valid data in a source block and new data into an open block in physical address space.

FIG. 8 illustrates another perspective of the process of relocating valid data 802 from a source block 804 to an open block 806 according to one implementation. In the example of FIG. 8, a non-volatile memory having multiple blocks 800 is disclosed. Several of the previously programmed blocks include valid data 802 and obsolete data 803. The valid data 802 and obsolete data 803 are shown in equal sized boxes in FIG. 8 for ease of reference. These equal size boxes may be a programming unit such as a page. In the example of FIG. 8 it is assumed that the compaction management module 112 of the controller 102 selects the block 800 with the least amount of valid data as the source block 804 for a garbage collection operation. The order that the controller 102 writes data into the open block 806 may be sequential, from A to H, where the data relocation of page A from the first offset position in the source block 804 is followed by new data writes B and C into the next sequential offset positions that correspond to obsolete data positions in the source block. The second page D of valid data 802 is then written in the next sequential location in the open block that is associated with the same physical offset position as in the source block. As no valid data remains to be written from the source block 804 after page D, new pages E-H are written from received host data into the remaining sequential positions in the open block. In order to write sequentially into the same physical address offset location, valid data from the source block 804 may be cached in RAM 116 (FIG. 2A) or other memory locations so that the controller 102 may alternate between relocation writes from the desired offset locations to the same offset location in the open block and immediately writing new data from the host to offset locations in the new block other than those corresponding to offset locations of valid data in the source block 804.

Figure 9:
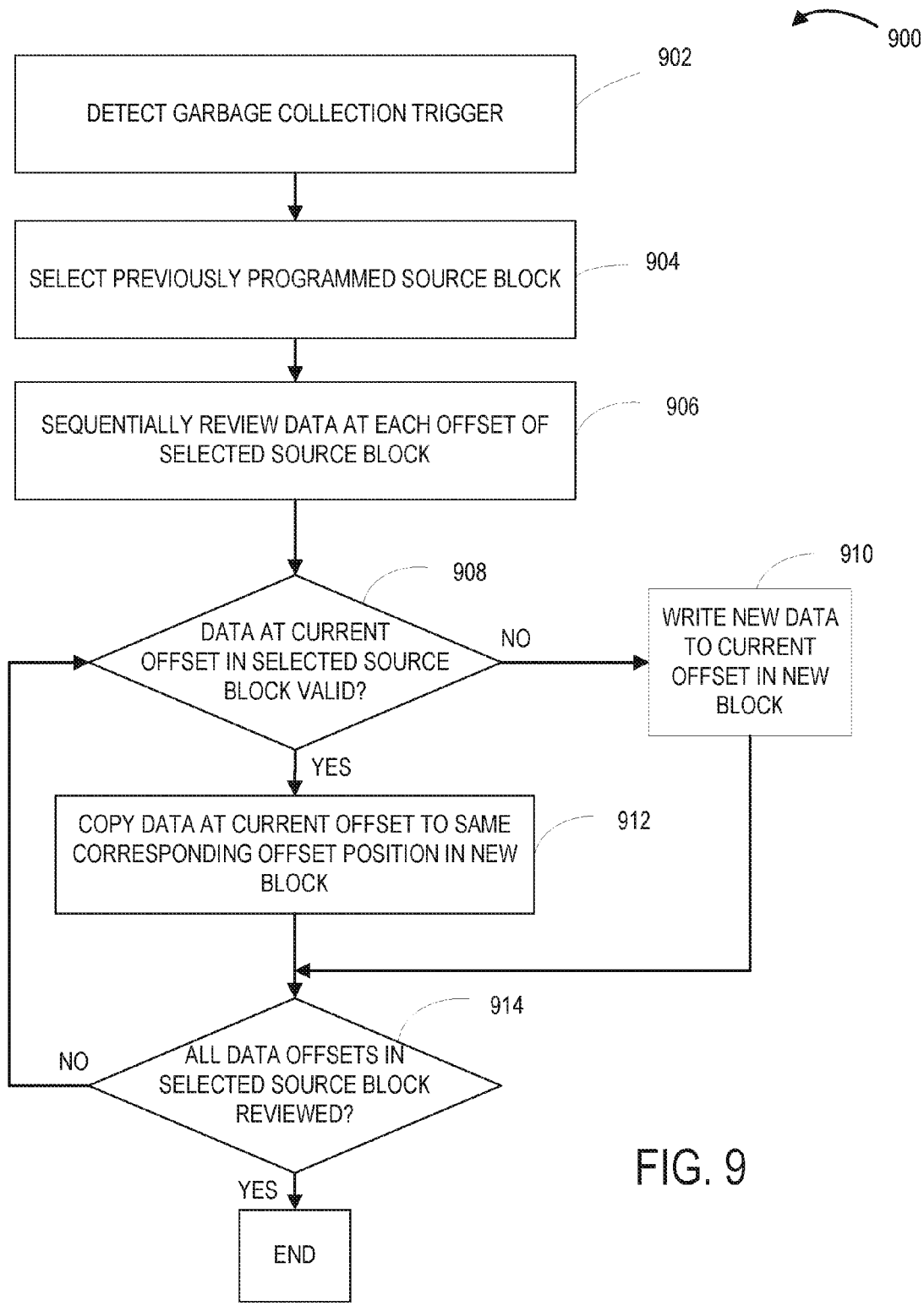
FIG. 9 is a flow chart illustrating a method of sequentially writing data into a destination block.

Referring now to FIG. 9, a flow diagram illustrates a method of performing a maintenance operation and writing host data, using the NVM system 100 described above, to minimize mapping table writes. When the controller 102 detects a maintenance trigger, such as a garbage collection trigger, a previously fully programmed block (sometimes referred to as a closed block) is selected as the source block for the operation (at 902, 904), The trigger may be any of a number of criteria, such as the number of free blocks falling below a predetermined threshold, the amount of valid data in the non-volatile memory, the amount of obsolete data in the non-volatile memory, and so on. The selection may be based on criteria such as the least recently used block, the block with the least amount of valid data, or any of a number of other criteria alone or in combination.

Once the source block has been selected, the controller 102, via the compaction management module 112 may sequentially review each page or other sequential offset increment in the selected block to determine if the data at that offset is valid and should be relocated to a new block (at 906). The new block, also referred to as an open block, may be an unwritten block prior to the start of the garbage collection operation. Stepping sequentially through the source block, for each sequentially reviewed offset location in the source block the compaction management module 112 causes the controller 102 to determine if the data is valid (at 908), for example by parsing the file allocation table (FAT) or other table tracking validity of data in the NVM system 100. If the data at the current offset position being examined in the source block is valid, then that data is copied to the corresponding offset position in the new block (at 912). If there is obsolete data at the current offset position being examined in the source block, then new data from the host may be written to that corresponding offset position in the new block (at 910). The process repeats, sequentially for every offset location, until all offset locations in the selected source block have been analyzed and the appropriate one of the valid data from the source block or the new data from the host have been written to the corresponding offset position in the new block (at 914).

Because data needs to be written in order when writing to a block, the compaction management module 112 cannot have the controller 102 first write all the valid data from the source block to the new block in the desired offset positions and then fill in gaps the new block with new data from the host (unless the all the valid data from the source block was sequential from the beginning of the block and only the tail end of the offsets required new data writes). In one implementation, the valid data that is being moved from the source block may be cached in RAM 116 or some other location so that, as space in the source block occupied by obsolete data is reached, the new data can be written immediately followed by more of the relocated valid data and so on. In this example, it is assumed that the writing is a left to right stripe across each page as shown by the example in FIG. 7 and the example combined garbage collection and new data writes to the open block in FIG. 8.

Figure 10:
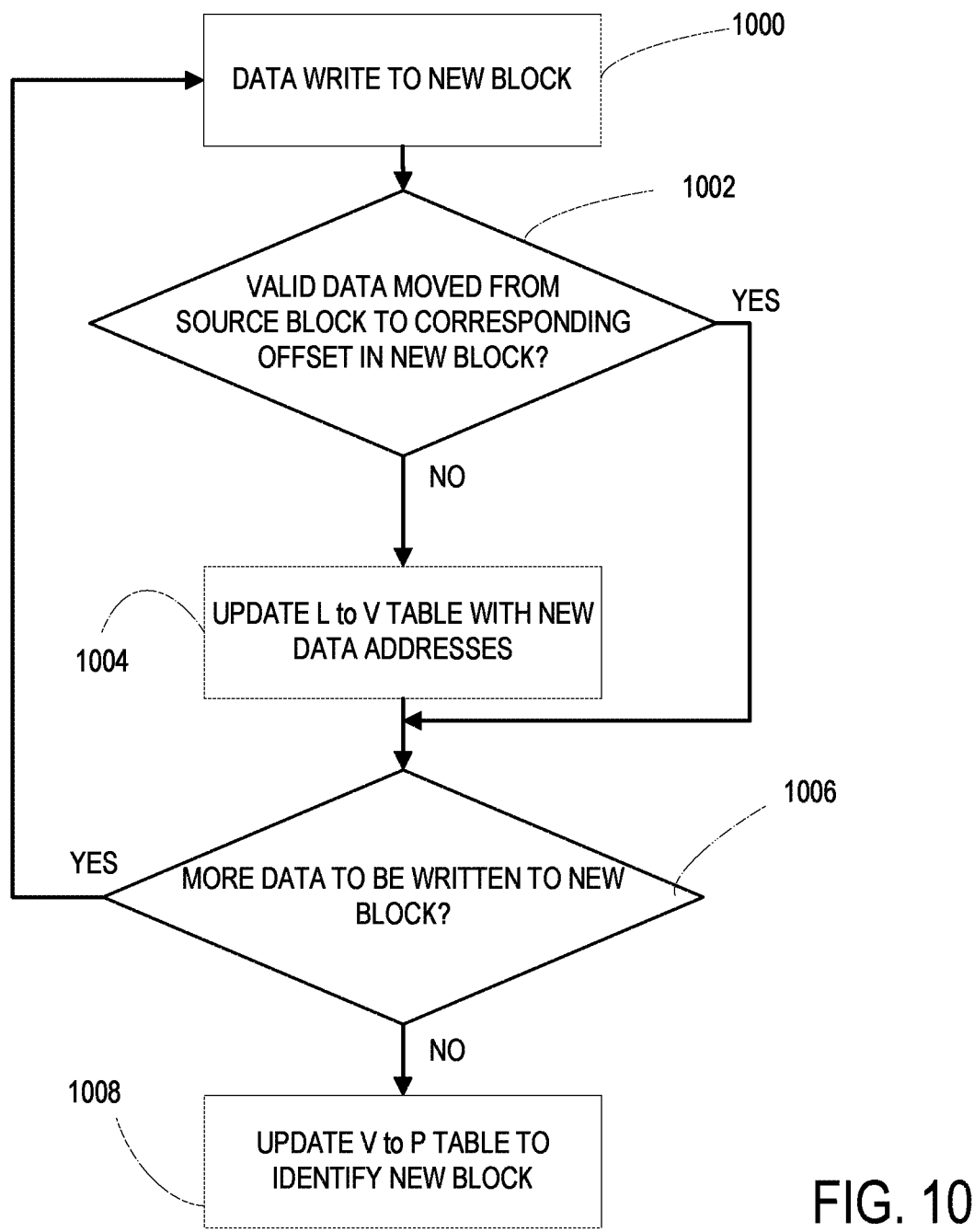
FIG. 10 is a flow chart illustrating a method of reducing mapping table updates when relocating valid data to a new block.

As a result of moving valid data to the same offset position in the new block as it had in the source block, the logical-to-virtual table 131 does not need to be updated for the logical addresses associated with that valid data and only the virtual-to-physical table 133 needs updating to identify the physical block change. The logical-to-virtual table 131 would need to be updated for any new data from the host that is written to offsets corresponding to obsolete data offsets in the source block. Referring to FIG. 10, a process of updating the mapping data is shown for a non-volatile memory system 100 implementing a garbage collection operation such as described in FIG. 9. For each programming unit of data relocated to the new (open) block in non-volatile memory (at 1000), only the virtual-to-physical mapping table 133 entry needs updating. This is because by moving valid data from a given offset position in the source block to the same offset position in the new block, there is no change needed in the logical-to-virtual mapping table. Accordingly, the step of updating the fine granularity logical-to-virtual mapping table 131 may be skipped (at 1002) and the controller 102 checks to see if more data needs to be written to the new block (at 1006).

In contrast, if there is no valid data in the source block at the current offset position being written to in the new block, then the data write to the new block is of new host data and the controller updates the logical-to-virtual mapping table 131 (at 1002, 1004). After the new block has been fully written to with relocated valid data and any new data needed to fill up the remainder of the new block, the virtual-to-physical mapping table is updated (at 1006, 1008) to associate the new physical block with the virtual block. The source block is then no longer associated with the virtual block and is thus released to be erased and reused when needed. Data writes copying valid data from offset positons in the source block to the same offset positions in the new block may take advantage of the fact that the logical-to-virtual mapping table remains the same for that particular data and only the mapping table entry for the virtual-to-physical mapping table that tracks the new physical block needs to be updated. Thus, by deliberately mapping valid data to the same offset location in the new physical block no mapping update is needed to the logical-to-virtual mapping table and logical-to-virtual mapping table updates are only needed for the new host data writes to the offset locations in the new block corresponding to offset locations of obsolete data in the source block.

Figure 11:
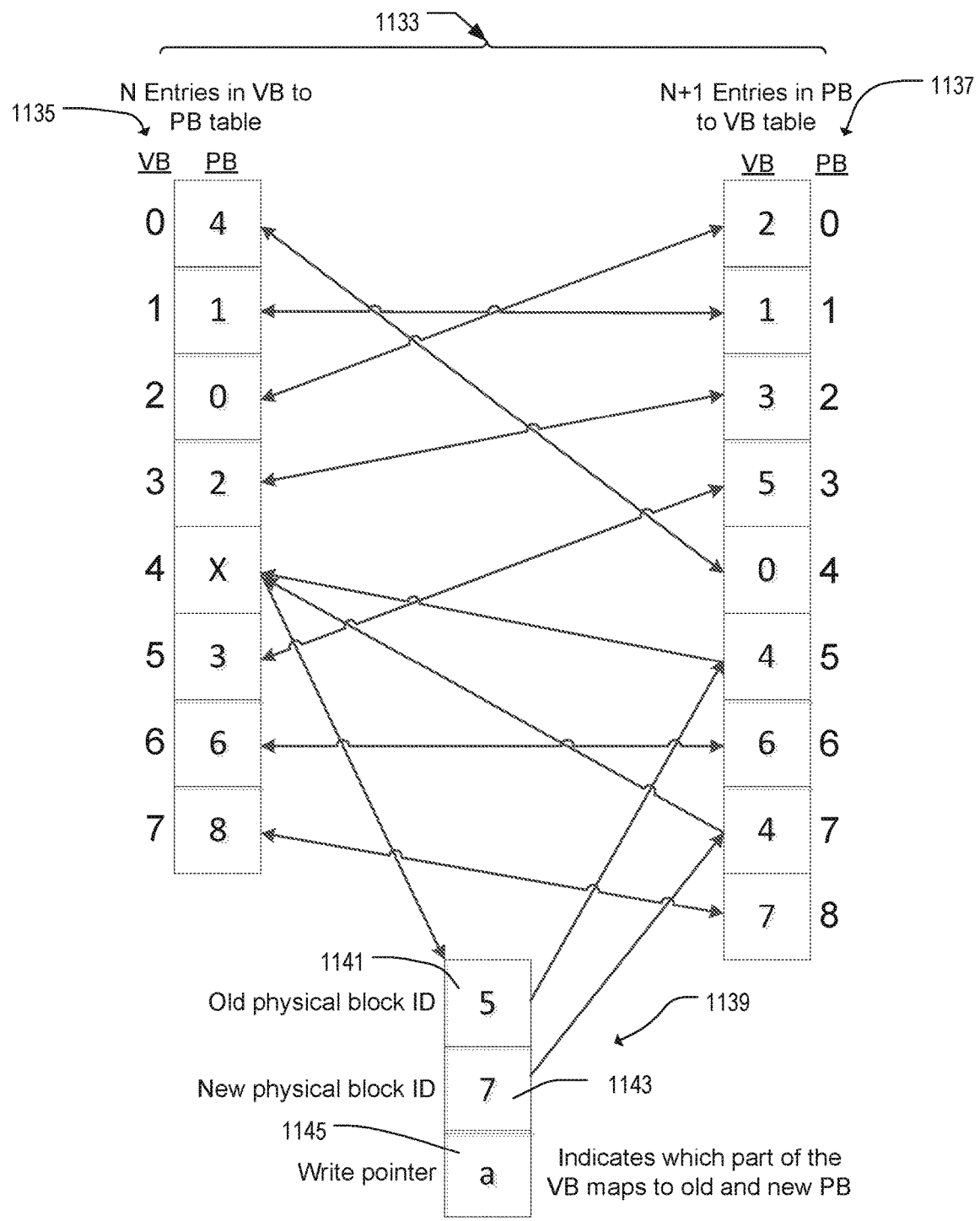
FIG. 11 is an example virtual-to-physical mapping of data in a non-volatile memory system according to one embodiment.

Referring now to FIG. 11, an implementation of a virtual-to-physical mapping table 1133, corresponding to virtual-to-physical mapping table 133 in FIGS. 2A and 5, may consist of multiple tables generated and updated by the controller 102. The virtual-to-physical mapping table 1133 may include a forward entry table 1135 and a reverse entry table 1137 to handle the update process when a new block is written to and a source block copied from. The forward entry table 1135 includes N entries mapping virtual blocks (VB) 0-7 to respective physical blocks (PB) 0-4 and 6-8. The reverse entry table 1137 maps physical block addresses to virtual blocks. In this implementation, a third table, identified as a transitional table 1139, is also part of the virtual-to physical mapping table 1133. The tables in FIG. 11 assume an 8 block system where N=7 blocks are maintained as fully programmed blocks and the $8^{th}$, or N+1, block is the new block used for relocation of valid data and new data. The example of FIG. 11 also assumes a memory system where the virtual block size and the physical block size are the same for ease of illustration. If multiple physical block sizes are present, such as illustrated in FIG. 5, then more than one virtual block may be mapped to a single physical block and the forward and reverse entry tables 1135, 1137, and the transitional table 1139, populated accordingly.

When a source block is identified for a maintenance operation, that source block becomes the old physical block ID block 1141, while the N+1 block being used as the new block is the new physical block ID 1143 in the transitional table 1139. The transitional table 1139 may include three entries in this implementation: the old physical block ID (source block from the garbage collection operation) 1141, the new physical block ID (open block that is used as the destination for the valid data from the source block) 1143, and a write pointer 1145 that tracks how far in the new block that the writing process has progressed. FIG. 11 captures the component tables 1135, 1137, 1139 of the virtual-to-physical mapping table 1133 at the point in time when the source block (physical block 5) and the destination block (physical block 7) have already been selected and the copying of data from one to the other has started. In the forward entry table 1135, the virtual block (virtual block 4) that was associated with physical block 5 is in transition and the designator "X" is shown as a placeholder in the transitional table 1139. The reverse entry table 1137 temporarily shows entries for both source physical block 5 and destination physical block 7 as pointing to virtual block 4. The write pointer 1145 in the transitional table 1139 identifies how far through the new physical block (physical block 7) that the writing has progressed.

The system and method described above reveals a way of reducing the amount of table updates necessary when a block is compacted in a non-volatile memory. The method and system may be used just for a limited and defined number of blocks, such as for blocks containing control data (e.g. the mapping table data itself), but may also apply to a larger group of blocks such as user data blocks. The method and system may reduce the burden of garbage collection by avoiding the need for certain control data writing (logical-to-virtual mapping entries in this example) that is typically performed when valid data is copied from a source block.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

A system and method for combining new data writes and compaction into a same destination block has been disclosed, where valid data copied from a source block to the destination block is copied into a same physical offset location as in the source block. Remaining offsets in the destination block corresponding to offset locations of obsolete data in the source block are filled with new data. Maintaining the same offset position in the destination block avoids the need to update logical to virtual mapping information and can reduce overhead typically associated with compaction operations.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

I claim:

1. A method for managing garbage collection in a non-volatile memory system comprising a non-volatile memory having a plurality of blocks, the method comprising:
selecting a fully programmed block in the non-volatile memory as a source block for compaction;
copying only valid data from the source block into a destination block in the non-volatile memory;
writing new data to the destination block;
wherein the valid data from the source block is copied into the destination block such that an offset location of the valid data in the destination block is identical to an offset location of the valid data in the source block and the new data is written into offset locations in the destination block corresponding to offset locations associated with obsolete data in the source block; and
wherein the non-volatile memory system further comprises a first mapping table containing a mapping of logical block addresses to virtual block addresses, and a second mapping table containing a mapping of virtual block addresses to physical block addresses, and wherein the method further comprises:
updating both the first and second mapping tables when writing the new data to the destination block; and
only updating the second mapping table when copying the valid data from the source block to the destination block.

2. The method of claim 1, wherein selecting the fully programmed block comprises selecting a least recently used block in the non-volatile memory.

3. The method of claim 1, wherein selecting the fully programmed block comprises selecting a block in the non-volatile memory having a least amount of valid data.

4. The method of claim 1, wherein the valid data from the source block only comprises mapping data for the non-volatile memory.

5. The method of claim 4, wherein writing new data comprises writing updated mapping data to the destination block.

6. The method of claim 1, wherein copying only valid data from the source block and writing new data comprises:
sequentially reviewing data at each data offset in the source block, wherein at each particular data offset:
when data at the particular data offset is valid data, copying the valid data from the particular data offset to an identical data offset in the destination block; and
when data at the particular data offset is obsolete data, writing new data to the identical data offset in the destination block.

7. A non-volatile memory system comprising:
a non-volatile memory having a plurality of memory blocks;
a first mapping table containing a mapping of logical block addresses to virtual block addresses in the non-volatile memory system;
a second mapping table containing a mapping of virtual block addresses to physical block addresses in the non-volatile memory system; and
a controller in communication with the non-volatile memory, the controller configured to:
select a fully programmed block from the plurality of memory blocks as a source block;
copy valid data from a particular offset location in the source block to a same particular offset location in a destination block in the plurality of memory blocks;
write new data to the destination block only at offset locations corresponding to offset locations of obsolete data in the source block, wherein the destination block contains all valid data from the source block in offset locations identical to original offset locations of the valid data in the source block upon completion of copying all valid data from the source block;
update both the first and second mapping tables when writing the new data to the destination block; and
only update the second mapping table when copying the valid data from the source block to the destination block.

8. The non-volatile memory system of claim 7, wherein the controller is configured to select a least recently used block in the non-volatile memory as the source block.

9. The non-volatile memory system of claim 7, wherein the controller is configured to select a block in the non-volatile memory having a least amount of valid data as the source block.

10. The non-volatile memory system of claim 7, wherein the source block only comprises mapping data for the non-volatile memory.

11. The non-volatile memory system of claim 10, wherein the new data comprises only updated mapping data.

12. The non-volatile memory system of claim 7, wherein the non-volatile memory comprises a silicon substrate and a plurality of memory cells forming a monolithic three-dimensional structure, wherein at least one portion of the memory cells is vertically disposed with respect to the silicon substrate.

13. The non-volatile memory system of claim 7, wherein to copy valid data and write new data to the destination block, the controller is further configured to:
sequentially review data at each data offset in the source block, and at each particular data offset:
when data at the particular data offset is valid data, copy the valid data from the particular data offset to an identical data offset in the destination block; and
when data at the particular data offset is obsolete data, write new data to the identical data offset in the destination block.

14. A non-volatile memory system comprising:
a non-volatile memory having a plurality of memory blocks;
a fine granularity mapping table containing mapping entries of logical addresses to virtual addresses;
a coarse granularity mapping table containing mapping entries of the virtual addresses to physical addresses associated with the plurality of memory blocks; and
a controller in communication with the non-volatile memory, the controller configured to:
relocate valid data from a source block selected from the plurality of memory blocks to a relocation block in the plurality of memory blocks;
write new data to the relocation block;
update both the fine granularity mapping table and the coarse granularity mapping table to map the new data written to the relocation block; and
update only the coarse granularity mapping table, without updating any fine granularity mapping table mapping entries, in response to relocating valid data from the source block to the relocation block.

15. The non-volatile memory system of claim 14, wherein the non-volatile memory comprises a silicon substrate and a plurality of memory cells forming a monolithic three-dimensional structure, wherein at least one portion of the memory cells is vertically disposed with respect to the silicon substrate.

16. The non-volatile memory system of claim 14, wherein to relocate the valid data and write the new data to the relocation block, the controller is configured to:
  sequentially review data at each data offset in the source block, wherein at each particular data offset the controller is further configured to:
    when data at the particular data offset is valid data, copy the valid data from the particular data offset to an identical data offset in the relocation block; and
    when data at the particular data offset is obsolete data, write new data to the identical data offset in the relocation block.

17. The non-volatile memory system of claim 14, wherein the source block only comprises mapping data for the non-volatile memory system.

18. The non-volatile memory system of claim 17, wherein the new data comprises only updated mapping data for the non-volatile memory system.

\* \* \* \* \*